United States Patent [19]
Murakami et al.

[11] 3,719,725
[45] March 6, 1973

[54] RESINOUS COMPOSITION CONTAINING POLYESTER-EPOXIDE RESIN ADDUCT AND ETHERIFIED AMIN-ALDEHYDE RESIN

[75] Inventors: Yoichi Murakami; Hikaru Watanabe, both of Amagasaki-shi, Japan

[73] Assignee: Dainippon Ink and Chemicals, Incorporated, Tokyo, Japan

[22] Filed: Jan. 19, 1971

[21] Appl. No.: 107,857

[30] Foreign Application Priority Data
Jan. 22, 1970 Japan..............................45/5436

[52] U.S. Cl. .............260/834, 260/37 EP, 260/39 R, 260/39 P, 260/830 P, 260/835
[51] Int. Cl..........................C08g 45/10, C08g 45/14
[58] Field of Search.......................................260/834

[56] References Cited

UNITED STATES PATENTS

| | | | |
|---|---|---|---|
| 3,655,817 | 4/1972 | Lohse | 260/834 |
| 3,410,926 | 11/1968 | Hicks | 260/834 |
| 3,173,971 | 3/1965 | Roth | 260/834 |
| 2,591,539 | 4/1952 | Greenlee | 260/834 |
| 2,850,475 | 9/1958 | Greenlee | 260/834 |
| 3,097,183 | 7/1963 | Drubel | 260/834 |
| 3,154,427 | 10/1964 | Forrest | 260/834 |
| 3,493,414 | 2/1970 | Hastings | 260/834 |
| 3,507,820 | 4/1970 | Maeda | 260/834 |
| 3,548,026 | 12/1970 | Weisfeld | 260/834 |
| 3,600,459 | 8/1971 | Vasta | 260/834 |

*Primary Examiner*—Paul Lieberman
*Attorney*—Sherman & Shalloway

[57] ABSTRACT

A resin composition suitable for use as paints is prepared by blending a polyfunctional high-molecular-weight linear polyester having a number average molecular weight of at least about 6,000 with an amino resin generally known as aminoplast or a polyisocyanate such as aliphatic or aromatic diisocyanate. The polyfunctional polyester is obtained by reacting a linear polyester having a number average molecular weight of about 1,000 to about 8,000 and a ratio of the terminal carboxyl group to the terminal hydroxyl group of at least 1 with a diepoxide at the epoxy group to the terminal carboxyl group ratio of from 0.5 to 2. The composition can give a baked film having excellent hardness, adhesion, chemical resistance, soiling resistance, and impact resistance.

2 Claims, No Drawings

RESINOUS COMPOSITION CONTAINING POLYESTER-EPOXIDE RESIN ADDUCT AND ETHERIFIED AMIN-ALDEHYDE RESIN

This invention relates to a resin composition suitable for use as a paint which comprises a polyfunctional high-molecular-weight linear polyester and an amino resin or a polyisocyanate.

It is known to use as a baking paint a resin composition comprising an amino resin and a high-molecular-weight linear polyester obtained by the glycol-removing reaction of a diglycol ester of a dibasic acid. This resin composition, however, cannot give a coated film of excellent properties since it is difficult to induce a cross-linking and curing reaction between the polyester and the amino resin.

An object of this invention is to provide a resin composition consisting predominantly of a high-molecular-weight polyester free from such defects.

It has been found that this object of the invention can be achieved by a resin composition prepared by blending an amino resin or a polyiso-cyanate with a polyfunctional high-molecular-weight linear polyester (to be referred to simply as polyfunctional polyester hereinafter) obtained by reacting a diepoxide with a linear polyester in which the ratio of the terminal carboxyl group to the terminal hydroxyl group is at least 1.

The linear polyester which is the starting material of the polyfunctional polyester is prepared from an optional dicarboxylic acid and an optional saturated dihydric alcohol, and is a linear polyester having a number average molecular weight of from about 1,000 to about 8,000 in which the ratio of the terminal carboxyl group to the terminal hydroxyl group is at least 1. The linear polyester may be those in which both ends are carboxyl groups. The reaction for producing the polyfunctional polyester can be performed either by the melting method or by the solvent method. The reaction can also be carried out in the presence of any known esterification catalyst.

The dicarboxylic acid that can be used as a material to produce the linear polyester includes, for instance, saturated aliphatic or aromatic dicarboxylic acids such as oxalic acid, malonic acid, succinic acid, glutaric acid, adipic acid, pimelic acid, suberic acid, azelaic acid, sebacic acid, brassylic acid, α-butyl-α-ethylglutaric acid, α,β-diethyl-succinic acid, phthalic anhydride, isophthalic acid, or terephthalic acid. Such dicarboxylic acids are described, for instance, in the specification of U. S. Pat. No. 3,236,812. These acids may be used conjointly with $C_{1-4}$ alkyl esters of these acids.

Examples of the saturated dihydric alcohol that can be used as the other material to produce the linear polyester preferably include low-molecular-weight saturated aliphatic dihydric alcohols such as ethylene glycol, diethylene glycol, 1,3-propylene glycol, 1,2-propylene glycol, 1,4-butylene glycol, 1,3-butylene glycol, 1,5-pentanediol, 1,4-pentanediol, 1,3-pentanediol, 1,6-hexanediol, 1,7heptanediol, 2,2-dimethyl-1,3-propanediol, 1,8-octanediol or 1,20-eicosanediol. These dihydric alcohols are described, for instance, in the specification of U. S. Pat. No. 3,236,812. Low-molecular-weight alicyclic dihydric alcohols such as 1,4-cyclohexane dimethanol or hydrogenated bisphenol A may also be used as the saturated dihydric alcohol.

When the solvent method is used to prepare the linear polyester, an organic solvent, for example, aromatic hydrocarbons such as xylol, toluol and benzene or ketones such as methyl ethyl ketone, methyl isobutyl ketone, cyclohexanone, or isophorone may be used. It is also possible to use mixed solvents consisting of these with esters such as ethyl acetate, butyl acetate and cellosolve acetate. These solvents can also be used in the manufacture of the polyfunctional polyester.

The polyfunctional polyester referred to in the present invention is a linear high-molecular-weight polymer having a number average molecular weight of about 6,000 or more, and is obtained by ring-opening esterification reaction of a linear polyester with a diepoxide with the ratio of the epoxy group to the terminal carboxyl group being maintained within the range of 0.5 to 2.

As the polyfunctional polyester, those having a considerably high molecular weight can be used, but the preferred polyfunctional polyesters are those having a number average molecular weight of at least about 6,000. There is no strict limitation in this regard. Commercially feasible polyfunctional polyesters have a number average molecular weight of up to about 100,000.

When the linear polyester is reacted with the diepoxide in an amount such that the ratio of the epoxy group to the terminal carboxyl group is outside the range of 0.5 to 2, only a polyfunctional polyester having low molecular weight is obtained. A cured film obtained by using such polyfunctional polyester having low molecular weight is inferior in film properties, and is not feasible.

The ring-opening esterification reaction is carried out by heating the linear polyester and the diepoxide directly or after dissolving them in an organic solvent, at a temperature of not more than 200° C., preferably below 150° C. When the reaction temperature is over 200° C., the hydroxyl group in the molecule of the resulting polyfunctional polyester undergoes an esterification reaction with the terminal carboxyl group of the unreacted linear polyester, which tends to cause the gellation of the reaction system. On the other hand, when a linear polyester having a molecular weight of less than 1,000 is used, the amount of the diepoxide necessary for increasing the molecular weight of the polyester becomes large, and consequently, the resulting polyfunctional polyester has too many functional groups. A composition obtained by blending an amino resin or polyisocyanate with such polyfunctional polyester is not desirable with respect to the efficiency of painting work and solubility. Linear polyesters having a molecular weight of over 8,000 are unsuitable for use in the present invention since the resulting high-molecular-weight polyesters have too few functional groups.

The diepoxide necessary for obtaining the polyfunctional polyester is any compound which has in its molecule two epoxy groups reactive with the carboxyl groups. Examples of the diepoxide include condensation products between bisphenol-A and epichlorohydrin such as Epikote 828, Epikote 1001, Epikote 1004, Epikote 1007 and Epikote 1009 (products of Shell Petroleum Co.); ester-type diepoxides such as diglycidyl phthalate, diglycidyl terephthalate, diglycidyl adipate, diglycidyl glutarate, diglycidyl succinate, diglycidyl oxalate, and diglycidyl azepate; alicyclic diepoxides such as limonene dioxide, dicyclopentadiene dioxide, vinyl cyclohexane dioxide, or 3,4-epoxy-6-methylcyclohexylmethyl-3,4-epoxy-6-methylcyclohexane carboxylate; and aliphatic ether type diepoxides, such as ethylene glycol diglycidyl ether, diethylene diglycol diglycidyl ether, triethylene glycol diglycidyl ether, 1,2-propylene glycol diglycidyl ether, 1,4-butylene glycol diglycidyl ether, 1,5-pentanediol diglycidyl ether, or glycerine diglycidyl ether. These diepoxides are described, for instance, in U. S. Pat. No. 3,245,925 and U. S. Pat. No. 3,378,601.

The resin composition of the present invention is obtained by blending an amino resin or a polyisocyanate with this polyfunctional polyester. The preferred weight ratio of the polyfunctional polyester to the amino resin or polyisocyanate is 95 : 5 to 75 : 25. If the ratio is outside the range of 99 : 1 to 60 : 40, a film obtained by heating and curing the composition does not have sufficient hardness, and is poor in adhesion, resistance to solvent, etc, since the amount of the polyfunctional polyester becomes extremely large or the amount of the amino resin or polyisocyanate becomes too large. In other words, when the amount of the polyfunctional polyester is extremely large, the cross-linking and curing of the composition is not sufficient, and when the amount of the amino resin or polyisocyanate is large, the number of the functional groups is excessive and results in a poor film.

The amino resin to be blended with the polyfunctional polyester is obtained by condensing a polyamino compound of low molecular weight with formaldehyde, paraformaldehyde or a compound which generates such aldehyde, or further etherifying the resulting resin with an alcohol. The resins which are generally called aminoplast are all included within this amino resin. Specific examples of the amino resin that is used in the invention include the condensation products between polyamino compounds of low molecular weight such as melamine, benzoguanamine, acetoguanamine, triazine, diazine, guanidine, guanamine, urea, thiourea, or ethyleneurea and formaldehyde, paraformaldehyde or a compound which generates such aldehyde; and the etherification products of these condensation products with alcohols having not more than 8 carbon atoms. The examples of such etherification products are methyletherified melamine resin, butyletherified melamine resin, and butyletherified benzoguanamine resin. These examples are described in the specification of U. S. Pat. No. 3,382,294. The amino resins which are particularly preferred in the present invention are the etherification products of the aforementioned condensation products with alcohols having not more than 8 carbon atoms.

The examples of the polyisocyanate that can be used in the present invention are described in the specification of U. S. Pat. No. 3,401,135, and include aromatic and aliphatic diisocyanates such as 2,4-tolylenediisocyanate, 2,6-tolylenediisocyanate, meta-xylene diisocyanate, para-xylene diisocyanate, diphenylmethane-4,4'-diisocyanate, 3,3'-dimethyl-4,4'-biphenylene diisocyanate, hexamethylene-1,6-diisocyanate, or butylene-1,2-diisocyanate; and the addition products between these diisocyanates and polyhydric alcohols of low molecular weight such as ethylene glycol, propylene glycol, trimethylol propane, glycerine, hexanetriol, sorbitol, mannitol or sorbitan. There can also be used block polyisocyanates obtained by treating the aforementioned isocyanates with a blocking agent such as phenols, tertiary alcohols, active methylene compounds, oximes, imines and lactams. Alicyclic diisocyanates such as isophorone diisocyanates, and polymers of the aforementioned diisocyanates can also be used.

The resin composition of the present invention can be diluted with a solvent prior to using it in various applications. Examples of the solvents that can be used for this purpose are, for example, alcohols such as methanol, ethanol, n-butanol, isobutanol, or butyl cellosolve, chlorinated hydrocarbons such as chloroform, trichloroethylene, or dichlorobenzene, ethers such as dioxane and tetrahydrofuran, and dimethyl formamide, in addition to the solvents mentioned above which can be used in the synthesis of the linear polyester. Mixtures of these solvents in optional combinations are suitably used in the present invention.

When the resin composition of the invention is used for instance as a paint, it is possible to incorporate a pigment in it. The pigments that can be used may be organic or inorganic, and include inorganic pigments such as clay, talc, zinc flower, lithopone, red iron oxide, red lead, chrome yellow, chrome green, Prussian blue, or carbon black, and organic pigments of the azo, phthalocyanine, quinacridone, anthraquinone, dioxazine, thioindigo, and perylene series.

When heated and cured, the resin composition of the invention forms a film which has excellent properties required of the film, such as solvent resistance, hardness, flexibility, resistance to soiling, adhesion, corrosion resistance, and chemical resistance. The resin compositions of the invention comprising the polyfunctional polyesters and polyisocyanates (other than the block polyisocyanates) can be cured at room temperature to form a film having excellent properties.

The resin composition of the invention may be in the form of a solution in a solvent, or in the form of powders. Such powdery resin composition can be prepared by blending a polyfunctional polyester substantially free of solvent with an amino resin such as the butyletherified melamine resin, methyletherified melamine resin or butyletherified benzoguanamine or the block polyisocyanate. The polyfunctional polyester substantially free of solvent can be prepared, for example, by heating a linear polyester and a diepoxide in the absence of a solvent, or concentrating a solution containing a polyfunctional polyester under reduced pressure followed by drying by a flush dryer, or by adding such solution dropwise to a non-solvent to coagulate it, followed by drying.

The resin composition of the invention can be used advantageously as paints, films, etc., especially the paints.

The invention will further be described in detail by the following Examples which are presented for illustrative, rather than limitative, purposes. Unless otherwise specified, all parts and percentages are by weight.

EXAMPLE 1

Neopentyl glycol (17.2 parts), 10.2 parts of ethylene glycol, 29.1 parts of dimethyl terephthalate and 0.009 part of zinc acetate were put into a flask equipped with a reflux condenser. With stirring in a stream of an inert gas, the materials were heated at 210° C. for about 2 hours. Methanol of the theoretical amount distilled out. To the reaction mixture 24.9 parts of isophthalic acid were added, and the mixture was maintained for 3 hours at 210° C. For promoting dehydration, 3 parts of xylol were added dropwise under reflux. The reaction was further continued for 5 hours while raising the reaction temperature gradually to 230° C. to form a high-molecular-weight polyester having an acid value of 24 and a hydroxyl value of 5.6. Its number average molecular weight calculated was about 3,800. The resulting polyester was dissolved in a mixed solvent of xylol/methyl ketone/cyclohexanone (50/25/25) so that its solids content reached 50 percent, to give a resin solution having a Gardner viscosity of P.

To 50 parts of the resin solution 1.1 parts of glycerine diglycidyl ether, 10 parts of xylol, 5 parts of cyclohexanone and 0.027 part of 2-methylimidazole were added, and the mixture was heated for 7 hours at 115° C. A solution of polyfunctional polyester having a non-volatile component content of 40.5 percent, an acid value of 1.9, and a Gardner viscosity of $Z_2$ was obtained. It had a number average molecular weight of about 7,500.

Butyletherified melamine resin (having a non-volatile component content of 50±1, a molecular weight of about 800 and a Gardner viscosity of A to D) was added to the solution of polyfunctional polyester at the ratio of 15 of the former to 85 of the latter. Rutile titanium oxide was added to the blend in an amount of 45 pigment percent, and the mixture was milled with three rolls to form white enamel. The resulting white enamel was coated on a 0.3 mm thick zinc iron plate by a bar coater to a baked film thickness of 15 to 18 $\mu$, and baked at 250° C. for 1 minute. As shown in Table 1, the resulting film has high hardness, and excellent properties such as flexibility, corrosion resistance and soiling resistance.

EXAMPLE 2

To 25 parts of the polyester obtained in Example 1 1.1 parts of glycerine diglycidyl ether was added, and they were reacted for 1 hour at 180° C. in the absence of a solvent and a catalyst. The product was dissolved in a mixed solvent of xylol/methyl isobutyl ketone/cyclohexanone (50/25/25) so that its solids content reached 40 percent, thereby forming a solution of a polyfunctional polyester having an acid value of 2.5 and a Gardner viscosity of $Z_2$.

White enamel was prepared in the same manner as described in Example 1 using the solution of the polyfunctional polyester, and baked. The properties of the film obtained were the same as those of the film obtained in Example 1.

EXAMPLE 3

Neopentyl glycol (21.3 parts), 12.7 parts of ethylene glycol, 52 parts of isophthalic acid, 12 parts of sebacic acid and 0.08 part of dibutyltin oxide were put in a flask equipped with a reflux condenser, and the materials were heated for 5 hours at 210° C. with stirring in a stream of an inert gas. Four parts of xylol were added dropwise, and the reaction was further continued for 5 hours while raising the reaction temperature gradually to 230° C. to form a high-molecular-weight polyester having an acid value of 22 and a hydroxyl value of 1.8. Its number average molecular weight calculated was about 4,700. The resulting polyester was dissolved in a mixed solvent of xylol/methyl isobutyl ketone/cyclohexanone (50/25/25) so that its solids content reached 50 percent, to form a resin solution having a Gardner viscosity of M to N.

To 90 parts of this resin solution 3.4 parts of Epikote 828 (the bisphenol type diepoxide of Shell Petroleum Co.), 8.2 parts of xylol, 5.9 parts of isobutanol and 0.048 part of 2-methylimidazole were added, and the mixture was heated at 115° C. for 8 hours to form a solution of resin having a non-volatile component content of 45.3 percent, an acid value of 1.8, and a Gardner viscosity of $Z_4$. Its number average molecular weight was about 11,000.

Using the resulting solution, white enamel was prepared in the same manner as in Example 1, and baked. The resulting film had very good properties as shown in Table 1.

EXAMPLE 4

In the same manner as set forth in Example 2, 29 parts of 1,2-propylene glycol, 52 parts of isophthalic acid, 12 parts of adipic acid, and 0.08 parts of dibutyl tin oxide were reacted to form a high-molecular-weight polyester having an acid value of 37 and a hydroxyl value of 1.4. Its number average molecular weight calculated was about 2,900. The polyester was dissolved in xylol so that its solids content reached 50 percent to form a resin solution having a Gardner viscosity of F.

To 50 parts of this resin solution 2.4 parts of diglycidyl tetrahydrophthalate, 6.5 parts of xylol, 6.5 parts of isobutanol and 0.03 part of 2-methyl imidazole were added, and the mixture was heated for 8 hours at 115° C. to form a resin solution having a non-volatile component content of 41.0 percent, an acid value 1.2, and a Gardner viscosity of $Z_3$. It had a number average molecular weight of about 14,000.

White enamel was prepared in the same way as in Example 1 using this resin solution, and baked. The resulting film had the excellent properties as described in Table 1.

EXAMPLE 5

One hundred parts of the polyfunctional polyester solution of Example 1 was blended with 12.1 parts of an addition product of hexamethy-lene diisocyanate and a polyhydric alcohol (non-volatile component content of 75 ± 1 percent, Gardner viscosity of K—O, NCO content of 13.5 ± 0.5 percent. The resulting solution was baked for 1 minute at 250° C. in the same manner as set forth in Example 1. The film obtained had the very good properties as described in Table 1.

COMPARATIVE EXAMPLE 1

Isophthalic acid (180 parts), 180 parts of adipic acid, 120 parts of trimethylol propane and 180 parts of neopentyl glycol were heated at 180° C. for 2 hours and then at 220° C. for about 7 hours with stirring in a stream of an inert gas to form a polyester resin having an acid value of 8. The resulting polyester resin was diluted with a mixed solvent of xylene/butyl cellosolve (9/1) so that its non-volatile component content reached 60 percent. The solution obtained had a Gardner viscosity of U-V and an acid value of 4.5.

The resulting polyester resin solution, butyletherified benzoguanamine resin (non-volatile content of 60 ± 1 percent, molecular weight of about 600, and Gardner viscosity of A–C), and the butyletherified melamine resin used in Example 1 were blended with one another at a ratio of 80 : 10 : 10 in terms of the solids content. The white enamel obtained was baked in the same way as set forth in Example 1. The film obtained was inferior to any of the films obtained in the foregoing Examples were respect to hardness, flexibility, adhesion, corrosion resistance, and chemical resistance. It was also found inferior in hardness at low temperatures and roll coating operability.

COMPARATIVE EXAMPLE 2

Neopentyl glycol (26.1 parts), 25.4 parts of ethylene glycol, 29.1 parts of dimethyl terephthalate and 29.1 parts of dimethyl isophthalate were put into a flask, followed by addition of 0.018 part of zinc acetate. The mixture was heated for about 2 hours at 210° C. with stirring in a stream of an inert gas. Methanol of the theoretical amount distilled out, and the ester-interchange reaction was completed. The temperature was raised to 245° C., and the pressure reduced to 0.3 mmHg gradually. The reaction mixture was maintained for 1 hour at 245° C., and then excess glycol was removed out of the reaction system by distillation. The temperature was raised to 275° C., and the reaction mixture was maintained at this temperature for 2 hours under the pressure of 0.3 mmHg. The polyester formed was a substantially hydroxyl-terminated resin having a number average molecular weight of greater than 10,000.

The resulting resin was dissolved in methyl ethyl ketone so that its solids content reached 30 percent. The solution of the resin was blended with the butyletherified melamine resin at a ratio of 85 : 15 in terms of the solids content, and white enamel was prepared and baked in the same manner as set forth in Example 1. The film obtained was inferior in film properties to any of those obtained in the Examples above, as will be seen from Table 1.

COMPARATIVE EXAMPLE 3

White enamel was prepared by blending the methyl ethyl ketone solution of the polyester obtained in Comparative Example 2 with the addition product of diisocyanate and polyhydric alcohol used in Example 5 at a ratio such that the hydroxyl/isocyanate ratio was 1 : 1; and was baked for 1 minute at 250° C. in the same manner as set forth in Example 1. The film obtained was inferior in the film properties to the film obtained in Example 5.

TABLE 1

| Properties | Examples 1 | 3 | 4 | 5 | 1 | Comparative Examples 2 | 3 |
|---|---|---|---|---|---|---|---|
| Pencil hardness | 5H | 3H | 4H | 4H | 2H | 3H | 3H |
| Impact strength | + | ++ | + | ++ | + | ± | + |
| Bending impact test | + | ++ | + | ++ | ± | ± | + |
| Adhesion (cross cut; adhesive tape peeling) | ++ | ++ | ++ | ++ | + | + | + |
| Resistance to soiling (rouge) | + | ± | + | + | + | – | – |
| Resistance to sulfuric acid (10 %, 24 hours) | + | ± | + | – | – | – | + |
| Resistance to sodium hydroxide (10 %, 24 hours) | 30 | ± | + | + | – | ± | ± |
| Resistance to xylol (rubbing test) | + | ++ | ++ | ++ | | – | – |
| Resistance to salt spray (100 hours) | ++ | ++ | ++ | ++ | + | ± | ± |

Note: In the above table, the symbols represent the following.
++Excellent
+Good
±Fair
–Poor
——Very poor

What is claimed is:

1. A resin composition comprising a polyfunctional, high-molecular-weight linear polyester having a number average molecular weight of at least about 6,000 and an etherified amine-aldehyde resin, said polyfunctional polyester being obtained by reacting a linear polyester derived from difunctional acids and diols said polyester having a number average molecular weight of about 1,000 to about 8,000 and a ratio of the terminal carboxyl group to the terminal hydroxyl group of at least 1 with a diepoxide at the ratio of the epoxy group to the terminal carboxyl group on the polyester being from 0.5 to 2:1, the polyfunctional high molecular weight linear polyester and the etherified amine-aldehyde resin being present at a ratio of 99:1 to 60:40.

2. The composition of claim 1 wherein said polyfunctional high-molecular-weight linear polyester has a number average molecular weight of 6,000 to 100,000.

* * * * *